US007191229B2

(12) United States Patent
Edmondson

(10) Patent No.: US 7,191,229 B2
(45) Date of Patent: Mar. 13, 2007

(54) SYSTEM AND METHOD FOR PROVIDING A CUSTOMER CONTROLLED NETWORK

(75) Inventor: Shawn E. Edmondson, Southlake, TX (US)

(73) Assignee: Masergy Communications, Inc., Irving, TX (US)

( * ) Notice: Subject to any disclaimer, the term of this patent is extended or adjusted under 35 U.S.C. 154(b) by 0 days.

(21) Appl. No.: 10/624,090

(22) Filed: Jul. 21, 2003

(65) Prior Publication Data

US 2004/0117613 A1    Jun. 17, 2004

Related U.S. Application Data

(60) Provisional application No. 60/397,081, filed on Jul. 19, 2002.

(51) Int. Cl.
*G06F 15/173* (2006.01)
(52) U.S. Cl. ................................. 709/224; 709/220
(58) Field of Classification Search ............... 709/223, 709/220, 224; 370/230, 468, 352, 412; 713/150
See application file for complete search history.

(56) References Cited

U.S. PATENT DOCUMENTS

| 6,072,773 | A  | * | 6/2000  | Fichou et al. ............... 370/230 |
| 6,169,748 | B1 | * | 1/2001  | Barbas et al. ............... 370/468 |
| 6,301,613 | B1 |   | 10/2001 | Ahlstrom et al. |
| 6,327,618 | B1 |   | 12/2001 | Ahlstrom et al. |
| 6,463,470 | B1 |   | 10/2002 | Mohaban et al. |
| 6,611,863 | B1 | * | 8/2003  | Banginwar .................. 709/220 |
| 6,636,505 | B1 | * | 10/2003 | Wang et al. ................. 370/352 |
| 6,769,024 | B1 | * | 7/2004  | Natarajan et al. ........... 709/224 |
| 6,940,864 | B2 | * | 9/2005  | Abdelilah et al. .......... 370/412 |
| 2002/0194317 | A1 | * | 12/2002 | Kanada et al. .............. 709/223 |
| 2003/0179703 | A1 | * | 9/2003  | Levy et al. ................. 370/230 |
| 2004/0117613 | A1 | * | 6/2004  | Edmondson ................ 713/150 |

OTHER PUBLICATIONS

World Wide Web, http://www.cisco.com/warp/public/784/packet/apr99/3.html, "End-to-End Quality of Service," Packet Magazine Archives, Second Quarter 1999, printed Jun. 24, 2002, 7 pages.
PCT Search Report, mailed Oct. 14, 2004 (4 pages).

* cited by examiner

*Primary Examiner*—Jungwon Chang
(74) *Attorney, Agent, or Firm*—Marc A. Hubbard; Gardere Wynne Sewell LLP

(57) ABSTRACT

The invention has a general objective of mapping applications that generate packets to a QoS policy on a packet routed network, such as an IP network, and automatically generating and/or changing the configuration of network elements, such as routers, to treat packets from the application according to the QoS policy. In accordance with a preferred embodiment of the present invention, high-level descriptions of applications and quality of service (QoS) treatment, for example, are automatically translated into low-level QoS configurations for routers. Application profiles specifying how traffic for those applications should be treated can be specified by those without detailed technical knowledge and QoS configurations automatically created for download onto customer premises equipment and, if necessary, also to access and backbone networks.

36 Claims, 7 Drawing Sheets

MASERGY Policy Manager – Microsoft Internet Explorer

File  Edit  View  Favorites  Tools  Help

MASERGY
Customer Controlled Intelligent Networks
SERVICE CONTROL CENTER

MASERGY Policy Manager                           Sites | Policies | Applications Configuration Commands for Site Site A

```
ip access-list extended MASERGY*****1
   permit tcp any any eq 25
   permit tcp any any eq 109
   permit tcp any any eq 110
   permit tcp any eq 25 any
   permit tcp any eq 109 any
   permit tcp any eq 110 any
exit
class-map match-any MASERGY*****2
   match access-group name MASERGY*****1
exit
class access-list extended MASERGY*****3
   permit tcp any any eq 1521
   permit tcp any eq 1521 any
exit
class-map match-any MASERGY*****4
   match access-group name MASERGY*****3
exit
ip access-list extended MASERGY*****5
   permit tcp any any eq 3200
   permit udp any any eq 3200
   permit tcp any eq 3200 any
   permit udp any eq 3200 any
exit
class-map match-any MASERGY*****6
   match access-group name MASERGY*****5
exit
ip access-list extended MASERGY*****7
   permit udp any any range 15001 15004
   permit udp any range 15001 15004 any
exit
class-map match-any MASERGY*****8
   match access-group name MASERGY*****7
exit
ip access-list extended MASERGY*****9
   permit udp any any eq 15000
   permit udp any eq 15000 any
exit
class-map match-any MASERGY*****10
   match access-group name MASERGY*****9
exit
policy-map MASERGY*****11
   class MASERGY*****10
      set ip precedence 5
      priority 561
   class MASERGY*****8
      set ip precedence 4
      priority 341
   class MASERGY*****6
      set ip precedence 1
      bandwidth percent 53
   class MASERGY*****4
```

*Fig. 3G*

SYSTEM AND METHOD FOR PROVIDING A CUSTOMER CONTROLLED NETWORK

RELATED APPLICATIONS

This patent application claims the benefit of Provisional Patent Application Ser. No. 60/397,081, entitled System and Method for Providing a Customer Controlled Network, filed on Jul. 19, 2002, the disclosure of which is incorporated herein by reference.

TECHNICAL FIELD OF THE INVENTION

The present invention relates generally to the field of computer networks, and more particularly to a system and method for providing a customer controlled network.

BACKGROUND OF THE INVENTION

Communications networks have finite capacity. When customers attempt to use more network capacity than is available, network equipment is forced to slow or stop some communications. A best-effort transport treats all traffic equally. In a network with best-effort delivery mechanisms, where for example, two end-users attempt to send 1 Mbps of traffic each across the same T1 line, typically the network will limit each user to 0.77 Mbps of bandwidth.

However, networks of a type that traditionally provide best-effort transport, such as Internet Protocol (IP) based networks, are now carrying data for many different types of applications, with different quality of service (QoS) requirements. Examples of these applications are web browsing, database access, Voice over IP (VoIP), and videoconferencing. Network performance degradation impacts these applications differently. For example, a ten percent drop in available bandwidth has a negligible effect on web browsing but makes VoIP unusable.

Furthermore, enterprises place different values on various applications. For example, to an insurance company, a SAP-based claims processing application is mission-critical. To such a company, a ten percent drop in performance of a SAP® application is much worse than a ten percent drop in web browsing performance.

To address this problem, network elements, such as routers and switches, are now capable of classifying and prioritizing traffic in order to meet quality of service requirements. Each network element must be configured for quality of service requirements. Network elements typically use command line interfaces to enter configuration information. For this purpose cryptic and often complex commands must be learned. Furthermore, the mechanisms for providing QoS in the network elements are based on low-level network criteria, such as IP addresses, User Datagram Protocol (UDP) and Transmission Control Protocol (TCP) port numbers. Thus, the underlying hardware and technology must be well understood.

Users who will also be referred to as customers, even if they are not purchasing, of wide area IP networks traditionally manage either their own routers directly or hire a service provider to do so. Direct management gives such user, complete control over their own equipment. However, customers must develop in-house expertise in router management. On the other hand, with a provider-managed router, customers do not need to develop router management expertise, but give up the ability to make arbitrary changes whenever they like.

Traditionally, either the user manages all aspects of a router configuration, or the service provider manages all aspects of the configuration. Since configurations are complex and cryptic, it is difficult to partition responsibility for different parts of a single configuration. Furthermore, traditionally, a "QoS policy" comprises a complex set of rules for classifying IP traffic and for tuning router parameters. For example, an access list may be used to match traffic on a particular port, say TCP port 6512, and route that traffic into a particular queue, say a weighted fair queue, with a particular weight, say 40.5. Furthermore, routers manufactured by different companies have different types of queues and different low level commands, thereby making it even more difficult for the customer to manage different aspects of configuring the router.

SUMMARY OF THE INVENTION

The invention has a general objective of mapping applications that generate packets to a QoS policy on a packet routed network, such as an IP network, and automatically generating and/or changing the configuration of network elements, such as routers, to treat packets from the application according to the QoS policy. In accordance with a preferred embodiment of the present invention, high-level descriptions of applications and quality of service (QoS) treatment, for example, are automatically translated into low-level QoS configurations for routers. Application profiles specifying how traffic for those applications should be treated can be specified by those without detailed technical knowledge and QoS configurations automatically created for download onto customer premises equipment (CPE) and, if necessary, also to access and backbone networks.

The invention is described and illustrated with reference to an exemplary application program embodying various aspects of the invention, which will be referred to herein as a "policy manager" (PM), that lets customers quickly and easily define application profiles. From the high-level descriptions provided by the customer, the PM automatically determines how to configure or reconfigure multiple network routers to translate the customer's high-level descriptions into low-level QoS configurations.

The PM in its exemplary embodiments thus provides one or more benefits and allows users to manage QoS across an enterprise network through a central web interface. Users do not need to know or understand the underlying router command line interface instructions that might vary from one manufacturer's router to another manufacturer's router. Users may control their own equipment and at the same time make changes whenever they like. Users do not need to understand the details of QoS for a particular router. The details of QoS are transparent to the user and the user may configure or reconfigure many routers through a single action. The PM makes it easy for users to accurately describe how they wish their networks to perform. For example, using the web interface component of the PM, the user may specify a service plane from a plurality of service planes for each of its applications. For example, a user may map a SAP® application to a priority service plane, an ORACLE® application to the priority service plane, PBX traffic to a voice service plane, and video traffic to a video service plane. The PM automatically translates the high-level policies specified by the user via the web interface into low-level QoS command-line interface (CLI) commands acceptable by the routers.

Other aspects and features of the invention will become apparent to those ordinarily skilled in the art upon review of the following description of specific embodiments of the invention in conjunction with the accompanying figures.

BRIEF DESCRIPTION OF THE DRAWINGS

For a more complete understanding of the present invention, the objects and advantages thereof, reference is now made to the following descriptions taken in connection with the accompanying drawings in which:

FIGS. 3A–3G are exemplary screen displays of a policy manager.

DETAILED DESCRIPTION OF THE DRAWINGS

Figure 1:
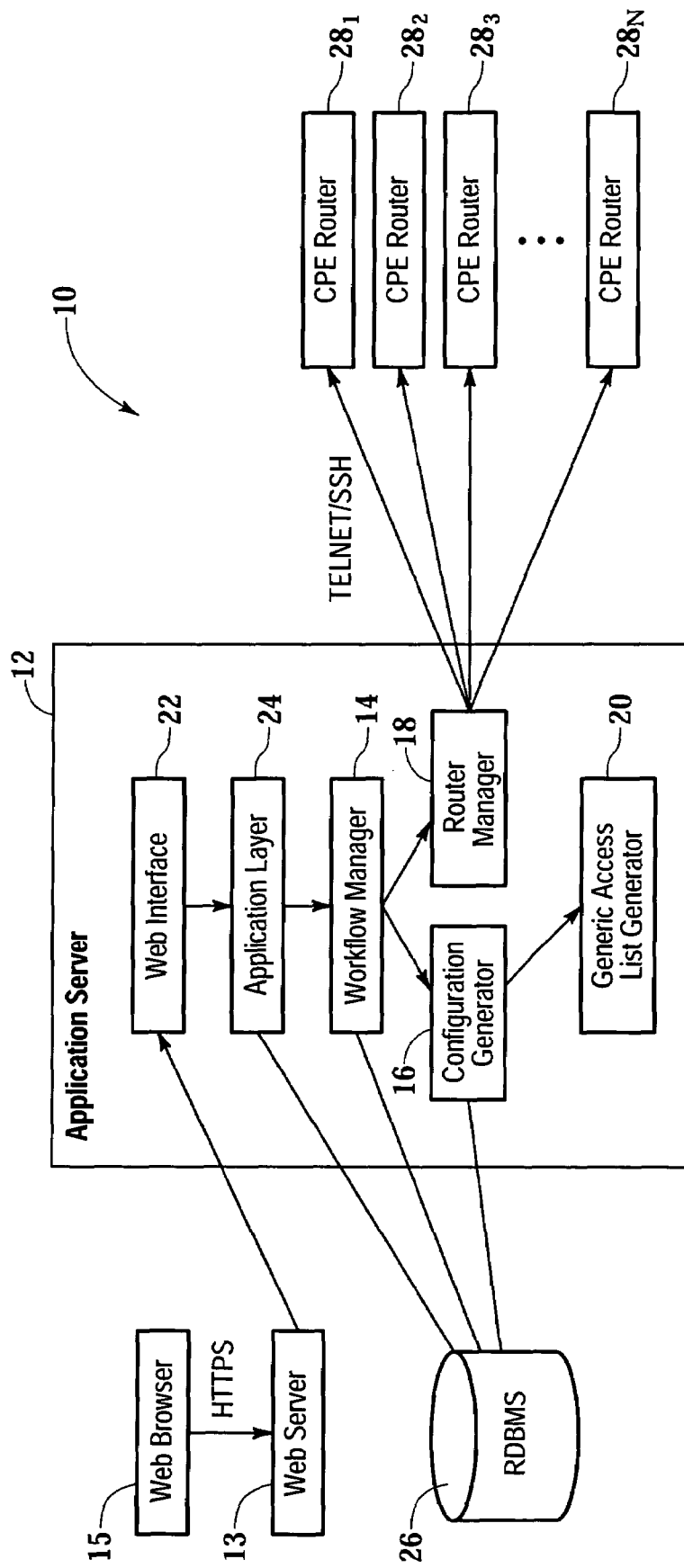
FIG. 1 is a schematic diagram of a customer controlled network.

In accordance with an embodiment of the present invention, high-level descriptions of applications and quality of service (QoS) treatment, for example, are automatically translated into low-level QoS configurations for routers on a network. Users (who may also be referred to herein as customers because they are typically purchasing the transport services from a third party, and because the PM can be of particular advantage to users of third-party-managed network) may thus be permitted to specify application profiles on how traffic for those applications should be treated and how QoS configurations automatically created for download onto routers and other equipment for marking of packets. The equipment may be customer premises equipment (CPE) and, if necessary, equipment on access and backbone networks.

Figures 3A, 3B:
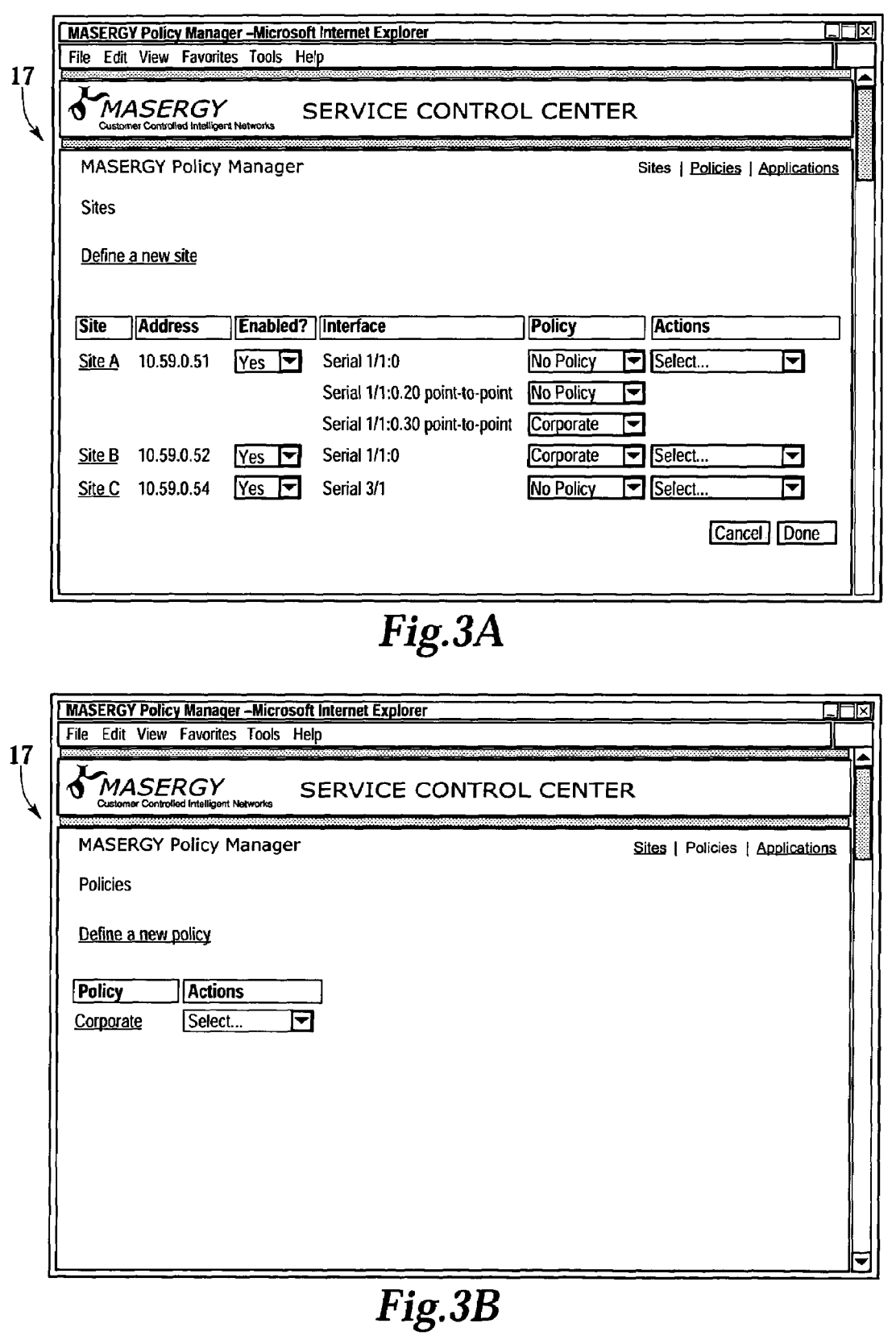
Figures 3C, 3D:
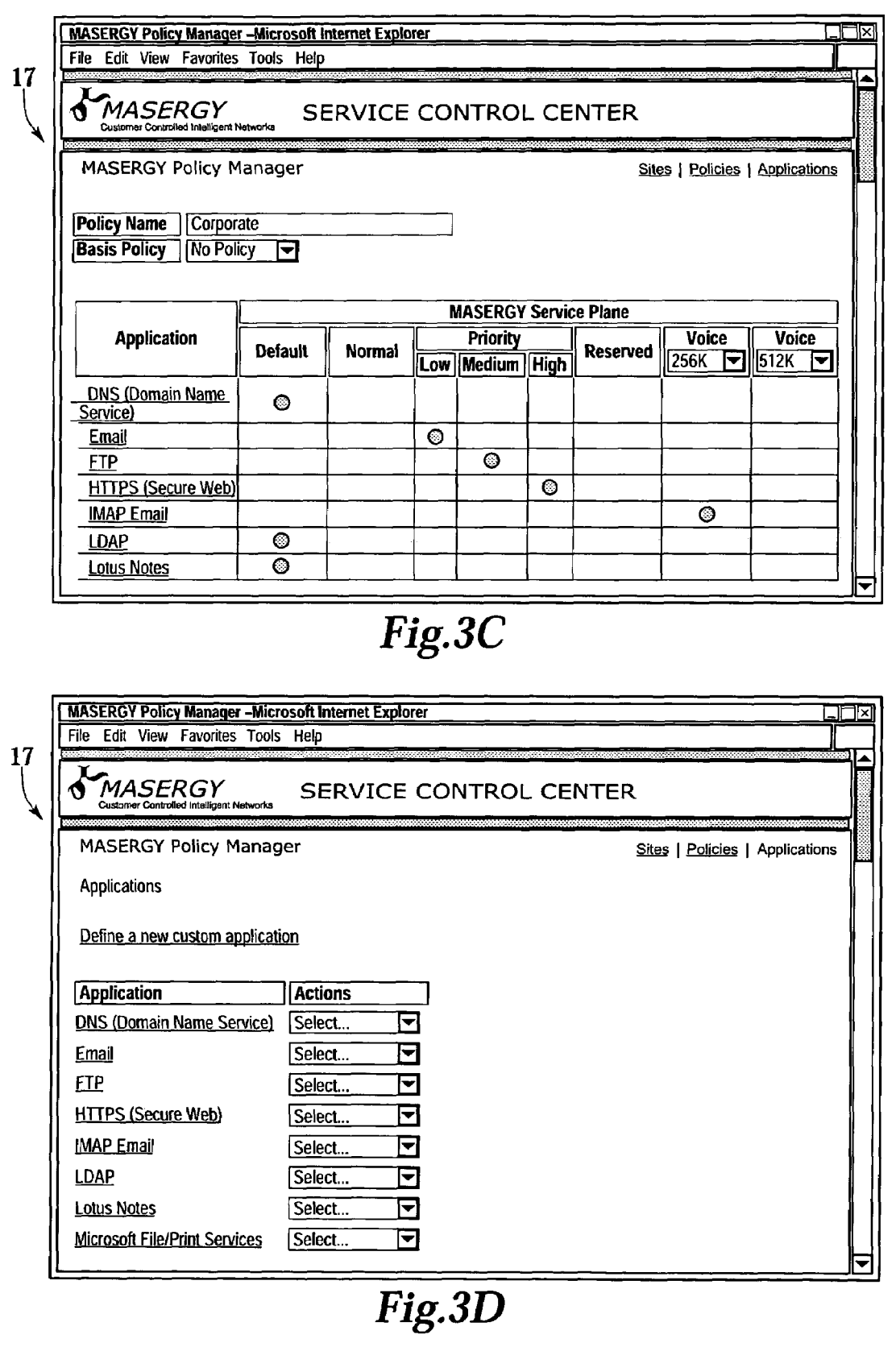

The invention will be described in reference to what will be referred to as a "policy manager" or "PM." PM 12 is either a program in its preferred embodiment or a service provided through a web server 13 accessible through a web browser 15. The invention is not limited to a PM as described. The PM preferably comprises a graphical user interface 17 (FIG. 3A) that lets customers quickly and easily define application profiles. From the high-level descriptions provided by the customer, PM 12 automatically determines how to configure or reconfigure multiple network routers $28_1$ through $28_N$ to translate the customer's high-level descriptions into low-level QoS configurations.

Briefly, in an exemplary embodiment, PM 12 receives application profiles from a customer. PM 12 converts the received application profiles into traffic descriptors. One or more generic, or vendor-independent, access lists are created from the traffic descriptors. Preferably, a generic access list is independent of router hardware. The vendor specific access list is then generated for the specific router(s) that will be marking the traffic for QoS treatment using, for example, DiffServ. Subsequently, the configurations of one or more routers in the network are updated with the access lists. A detailed description for each of the above steps follows.

PM 12 receives application profiles from a customer. Because routers use low-level network criteria, such as Transmission Control Protocol (TCP) port numbers, User Datagram Protocol (UDP) port numbers, IP protocol numbers, IP precedence values, etc., traditionally the most complex part of configuring QoS on a traditional router using a Common-Line Interface (CLI) is creating the rules to classify traffic.

PM 12 may, if desired, include a plurality of predefined default applications. For example a SAP® application may, by default, communicate through a specific port number. Thus, the customer can simply select the applications it is interested in from the plurality of predefined applications by using graphical user interface component 17 of PM 12. Furthermore, PM 12 makes it easy for the customer to create new applications in terms of underlying network criteria. For example, if a legacy application PolicyRater uses TCP and runs on TCP port 15567, the customer can use graphical user interface component 17 of PM 12 to define a PolicyRater application that matches those network criteria. Once an application has been defined, the customer does not have to consider low-level network criteria. They can simply use the application by name in the PM policy definition.

The network preferably includes a plurality of predefined service planes for QoS from which a customer may select for mapping to the applications. Examples of such service planes are:

Normal—Best-effort traffic.
Priority Data—Prioritized data applications. Within Priority, traffic may be classified Low, Medium, or High.
Reserved Bandwidth—Reserved bandwidth for bandwidth-critical applications.
Video—Reserved bandwidth with videoconferencing-quality latency and packet delivery.
Voice—Reserved bandwidth with voice-quality latency and packet delivery.

The PM users assign application profiles to service planes. PM 12 takes two actions depending on the service plane selection:

Marking—The PM uses DiffServ marking to mark each service plane differently. The network core uses these markings to differentiate traffic. For example, the PM marks voice traffic with IP precedence value 101.
Prioritization—The PM prioritizes traffic on the outbound serial line. With reference to the exemplary service planes described above, the PM assigns reserved bandwidth capacity for Reserved, Video, and Voice. For Priority and Normal, the PM assigns relative priorities.

Internally, PM 12 describes application profiles as traffic descriptors. PM 12 converts the received application profiles into traffic descriptors. Traffic descriptors are Boolean expressions on primitive network predicates. For example, web traffic is TCP traffic to or from TCP port 80. Thus, for example, the traffic descriptor for web traffic can be expressed as AND(protocol=tcp, OR(source-port=80, dest-port=80)). However, Boolean expressions are difficult for non-technical customers to describe and edit. To simplify traffic description, PM 12 provides application profile abstraction which automatically converts application profiles into traffic descriptors thereby utilizing the power of traffic descriptors while hiding the complexity of Boolean expressions from the customer.

In an exemplary embodiment, an exemplary application profile comprises:

One of the following combination rules:
All—Match traffic that meets all of the following criteria.
Some—Match traffic that meets at least one of the following criteria.
None—Match traffic that does not meet any of the following criteria.
Zero or more "simple application descriptors"
Zero or more included application profiles
A simple application descriptor may comprise of one or more of the following properties:

Protocol (Any, TCP, or UDP)
Source address (Any, a specific address, or a subnet)
Destination address
Source TCP/UDP ports (Any, or a specific port, or a range of ports)
Destination TCP/UDP ports
IP precedence value (0 through 7)
IP type of service (TOS) value (0 through 15)

A simple application descriptor represents the conjunction (logical AND) of all its components. For example, a simple application descriptor that specifies TCP for protocol and 80 for source ports matches traffic that (1) is TCP, and (2) originates from TCP port 80.

By combining simple application descriptors in application profiles, and optionally combining multiple application profiles into compound application profiles, customers can easily describe complex traffic classes.

To translate an application profile into a traffic descriptor, PM 12:

Translates each simple application descriptor into an AND.

Translates each included application profile into a traffic descriptor.

Combines the resulting traffic descriptors according to the combination rule:

All—Build an AND of the components.

Some—Build an OR of the components.

None—Build an AND of the negations of the components.

EXAMPLES

HTTP

To match simple web traffic, define an application profile HTTP using the combination rule "Some" and two simple application descriptors:

protocol=TCP, source port=80
    protocol=TCP, destination port=80

This application profile corresponds to the following traffic descriptor: OR(AND(protocol=tcp, source port=80), AND(protocol=tcp, destination port=80)).

Web

To match insecure and secure web traffic (HTTP or HTTPS), define an application profile using the combination rule "Some," two simple application descriptors, and a single included application profile "HTTP." The application descriptors are given by:

protocol=TCP, source port=443
    protocol=TCP, destination port=443.

This application profile corresponds to the following traffic descriptor:

```
OR(
    AND(protocol = tcp, source port = 80),
    AND(protocol = tcp, destination port = 80),
    AND(protocol = tcp, source port = 443),
    AND(protocol = tcp, destination port = 443)).
```

Non-Marketing Web

Consider an enterprise where the marketing department uses a 10.2.3.0/24 subnet. The application profile NonMarketingWeb matches all web traffic from corporate departments other than the marketing department.

First, define an application profile MarketingSubnet that matches the marketing department subnet. Use the combination rule "Some" and two simple application descriptors—one that matches a source address of 10.2.3 in the 255.255.255.0 netmask, and another that matches a destination address of 10.2.3 in the 255.255.255.0 netmask. Then define an application profile NonMarketingSubnet by using the combination rule—None and including a single application profile—MarketingSubnet. Finally, define the NonMarketingWeb profile by using the combination rule—All to combine Web and NonMarketingSubnet.

This application profile corresponds to the following traffic descriptor:

```
AND(
    /Web/
    OR(
        AND(protocol = tcp, source port = 80),
        AND(protocol = tcp, destination port = 80),
        AND(protocol = tcp, source port = 443),
        AND(protocol = tcp, destination port = 443)),
    AND(
        /NonMarketingSubnet/
        NOT(
            /MarketingSubnet/
            OR(
                AND(source address = 10.2.3/255.255.255.0),
                AND(destination address = 10.2.3/255.255.255.0)))))
```

PM 12 uses the traffic descriptor abstraction to describe subsets of the universe of IP data packets. For example, to construct a policy that prioritizes web access, PM 12 abstracts the set of all possible web data packets. A traffic descriptor matches the set of all IP data packets that evaluate to true under the traffic descriptor's Boolean expression. Exemplary Table A provides a list of elements that form traffic descriptors:

TABLE A

| ELEMENT SCHEMA | DESCRIPTION |
| --- | --- |
| All | Matches all traffic. |
| None | Matches no traffic. |

TABLE A-continued

| ELEMENT SCHEMA | DESCRIPTION |
| --- | --- |
| Protocol = PROTOCOL | Matches traffic of the given IP protocol PROTOCOL. |
| source address = ADDR | Matches traffic from the given source IP address ADDR, |
| source address = ADDR/MASK | matching on nonzero bits of MASK, which defaults to 255.255.255.255. |
| source port = PORT | Matches TCP or UDP traffic from the given TCP/UDP |
| source port = MIN . . . MAX | port numbers. |
| Destination address | Like source address, but for destinations. |
| Destination port | Like source port, but for destinations. |
| Precedence = VALUE | Matches traffic with an IP precedence value of VALUE. |
| tos = VALUE | Matches traffic with an IP TOS value of VALUE. |
| AND($expr_1$, $expr_2$, . . . , $expr_N$) | Matches traffic that matches all of $expr_1$, $expr_2$, . . . , $expr_N$. |
| OR($expr_1$, $expr_2$, . . . , $expr_N$) | Matches traffic that matches at least one of $expr_1$, $expr_2$, . . . , $expr_N$. |
| NOT(expr) | Matches traffic that does not match expr. |

Internally, PM 12 preferably represents traffic descriptors as tree data structures. PM 12 applies rules to simplify traffic descriptors as much as possible. Such simplification speeds configuration generation and results in shorter, faster configurations. Exemplary Table B provides a list of simplification rules that may be used by PM 12:

TABLE B

| RULE | EXAMPLES |
| --- | --- |
| splice like expression arguments | AND(AND(a, b), c) → AND(a, b, c) |
| delete non-primitive NOTs | NOT(AND(a, b)) → OR(NOT(a), NOT(b)) |
|  | NOT(OR(a, b)) → AND(NOT(a), NOT(b)) |
|  | NOT(NOT(a)) → a |
| combine network primitives | Some network primitives can combine under AND or OR. Some schematic examples: |
|  | AND(port = 10 . . . 100, port = 50 . . . 200) → port = 50 . . . 100. |
|  | AND(port = 10 . . . 100, port = 200) → none |
|  | AND(address = 1.2.3.4/255.0.255.0, address = 5.6.7.8/0.255.0.255) → address = 1.6.3.8. |
|  | NOT(port = 0 . . . 100) → port = 101 . . . 65535 |
| same-sign subset rule | In an AND, if there are two clauses α and β such that α's OR-clauses form a subset of β's OR-clauses, then β may be eliminated. (And conversely for OR over AND.) For example, AND(P, X, Y, OR(P, Q, R)) → AND(P, X, Y) taking α = P and β = OR(P, Q, R). |
| opposite-sign subset rule | In an AND, if there are two clauses α and β such that the OR-clauses of the negation of α form a subset of the OR-clauses of β, then the OR-clauses of the negation of α may be dropped from β. (And conversely for OR over AND.) For example, AND(P, Q, R, OR(NOT(P), X, Y)) → AND(P, Q, R, OR(X, Y)) taking α = P and β = OR(NOT(P), X, Y). |
| eliminate trivial ANDs and ORs | AND(x) → x |
|  | OR(x) → x |

PM 12 preferably comprises a generic access list generator 20. Preferably, one or more generic access lists are created from the traffic descriptors. Preferably, a generic access list is created for each application profile. A generic access list comprises of one or more statements. A statement comprises of a clause and a match rule, for example a permit or a deny. A clause is preferably a list of network criteria, such as protocol, source address, destination address, source port, destination port, IP precedence value, IP TOS value, and/or the like. An exemplary clause may be given by <source address=1.1.2.2, destination port =80>. Preferably, clauses are logical ANDs and may not contain negations or ORs.

The following is a generic access list for matching HTTP traffic:

permit <protocol = tcp, source port = 80>
permit <protocol = tcp, destination port = 80>
deny all The following is a generic access list for the application profile NonMarketingWeb described above:

deny <source address = 10.2.3/255.255.255.0>
deny <destination address = 10.2.3/255.255.255.0>
permit <protocol = tcp, source port = 80>
permit <protocol = tcp, destination port = 80>

-continued

```
permit <protocol = tcp, source port = 443>
permit <protocol = tcp, destination port = 443>
deny all
```

Preferably, generic access lists are non-hierarchical. To evaluate a data packet against a generic access list, the first clause that matches the packet is determined. If the matching clause's statement is a permit statement, then the access list matches the packet. If the access list is being used to select packets for a particular bandwidth class, then the bandwidth class applies to that packet. If the matching clause's statement is a deny statement, then the access list does not match the packet. If the access list does not match, then the bandwidth class does not apply to that packet. Other classes and generic access lists map still apply. If no list applies, then preferably best-effort delivery is used.

A traffic descriptor may correspond to multiple generic access lists. For example, consider the traffic descriptor AND(source address=1.1.1.1, NOT(source port=15)). One generic access list that the above traffic descriptor corresponds to is:

```
<deny <source port = 15>,
permit <source address = 1.1.1.1>,
deny all>
```

Another generic access list that the above traffic descriptor corresponds to is:

```
<permit <source address = 1.1.1.1, source port = 0...14>,
permit <source address = 1.1.1.1, source port = 16...65535>,
deny all>
```

It is desirable to find the shortest generic access list that corresponds to a given traffic descriptor. However, this problem is "NP-complete," a computer science term that indicates that a problem is intractable. In other words, it is impossible to write a computer program that is guaranteed to solve the generic access list translation problem exactly in a reasonable amount of time. However, it is possible to write an efficient algorithm that finds good approximate solutions. PM 12 uses an algorithm that finds generic access lists quickly, but does not always find the shortest possible generic access list.

There may be two types of generic access lists—a theory and a complete theory. A theory is a partially constructed access list with an unfinished component represented as a traffic descriptor. A theory is written as a pair of the access list statements generated so far and the traffic descriptor for the unfinished portion (the remainder). For example, any traffic descriptor D corresponds to the theory <<>, D>(the empty generic access list followed by D). A complete theory is a theory with a complete generic access list and a remainder of none.

To generate an access list, PM 12 uses a pool of theories starting with the <<>, D>theory. The PM repeatedly removes a theory from the pool, derives new theories from that theory, and adds the new theories to the pool. The PM seeks to generate simpler theories (theories that have longer access lists and shorter remainders than their bases). The PM is finished when it finds a complete theory.

An exemplary simple derivation of the generic access list for HTTP traffic is given below:

```
<<>, OR(AND(protocol = tcp, source port = 80),
    AND(protocol = tcp, destination port = 80))>
<<permit <protocol = tcp, source port = 80>>,
    AND(protocol = tcp, destination port = 80)>
<<permit <protocol = tcp, source port = 80>,
    permit <protocol = tcp, destination port = 80>>, none>
```

To complete the above schematic algorithm, an explanation of how to derive theories and how to select the next theory to work on is provided below.

Theory Derivation:

PM 12 uses rules for adding a new access list statement.

Permit Rule

Consider a theory $T_1 = <<S_1, S_2, \ldots, S_N>, R>$ where remainder $R = OR(E_1, E_2)$. If $E_1$ is directly translatable into an access list clause X, then a new theory $T_2 = <<S_1, S_2, \ldots S_N, \text{permit } X>, E_2>$ may be derived. For example, consider the following partial theory:

```
<<permit <source address = 1.1.1.1>>,
OR(AND(protocol = tcp, source port = 80),
    AND(protocol = tcp, destination port = 80))>
```

AND(protocol = tcp, source port = 80) is directly translatable into an access list clause <protocol = tcp, source port = 80>. So, the permit rule may be used to derive this theory:

```
<<permit <source address = 1.1.1.1>,
permit <protocol = tcp, source port = 80>>,
AND(protocol = tcp, destination port = 80)>
```

A second application of the permit rule to the above theory would derive a complete theory.

Deny Rule

Consider a theory $T_1 = <<S_1, S_2, \ldots, S_N>, R>$ where remainder $R = AND(E_1, E_2)$. If the negation of $E_1$ is directly translatable into an access list clause X, then a new theory $T_2 = <<S_1, S_2, \ldots, S_N, \text{deny } X>, E_2>$ may be derived. For example, consider the partial theory:

```
<<permit <source address = 1.1.1.1>>,
AND(OR(NOT(protocol = tcp), NOT(source port = 1500)),
    OR(protocol = tcp, destination port = 80))>
```

Consider the clause OR(NOT(protocol=tcp), NOT(source port=1500)). Its negation is AND(protocol=tcp, source port=1500), which is directly translatable into an access list clause. So, the deny rule may be used to derive this theory:

```
<<permit <source address = 1.1.1.1>,
deny <protocol = tcp, source port = 1500>>,
OR(protocol = tcp, destination port = 80)>
```

Complex Theory Derivation:

Most derivations revolve around the permit and deny rules. However, for many traffic descriptors, neither rule applies. For example, consider the traffic descriptor:

OR(AND(source port=5, not(source address=1.1.1.1)),
AND(source port=7, not(source address=2.2.2.2)))

The outer OR implies the permit rule. However, neither OR clause can be represented as a single access list clause.

The PM preferably uses two techniques on theories where neither simple rule applies—Cross Multiplication and Clausal Inflation.

Cross Multiplication

Any AND of ORs may be converted into an OR of ANDs, or vice versa, by cross-multiplying, since AND is distributive over OR and vice versa. By cross-multiplying and simplifying, the PM often transforms inconvertible remainders to convertible remainders.

Clausal Inflation

Consider a network primitive such as NOT(source port=50). The NOT may be eliminated by increasing the number of clauses: NOT(source port=50)→OR(source port=0 . . . 49, source port=51 . . . 65535). This is a deliberate reversal of a simplification rule.

By inflating, the PM can transform inconvertible remainders into convertible remainders.

Table C illustrates an exemplary conversion of an exemplary traffic descriptor into a generic access list.

TABLE C

Input:
<<>, OR(AND(source port = 5, NOT(source address = 1.1.1.1)),
    AND(NOT(source port = 7), source address = 2.2.2.2))>
After inflating NOT(source port = 7):
<<>, OR(AND(source port = 5, NOT(source address = 1.1.1.1)),
    AND(OR(source port = 0...6, source port = 8...65535),
        Source address = 2.2.2.2))>
Cross-multiply against the inflation result:
<<>, OR(AND(source port = 5, NOT(source address = 1.1.1.1)),
    OR(AND(source port = 0...6, source address = 2.2.2.2),
        AND(source port = 8...65535, source address = 2.2.2.2)))>
Splice OR of OR:
<<>, OR(AND(source port = 5, NOT(source address = 1.1.1.1)),
    AND(source port = 0...6, source address = 2.2.2.2),
    AND(source port = 8...65535, source address = 2.2.2.2))>
Use the permit rule:
<<permit <source port = 0...6, source address = 2.2.2.2>>,
    OR(AND(source port = 5, NOT(source address = 1.1.1.1)),
    AND(source port = 8...65535, source address = 2.2.2.2))>
Use the permit rule:
<<permit <source port = 0...6, source address = 2.2.2.2>
    permit <source port = 8...65535, source address = 2.2.2.2>>,
    OR(AND(source port = 5, NOT(source address = 1.1.1.1)))>
OR(x) → X:
<<permit <source port = 0...6, source address = 2.2.2.2>
    permit <source port = 8...65535, source address = 2.2.2.2>>,
    AND(source port = 5, NOT(source address = 1.1.1.1))>
Use the deny rule:
<<permit <source port = 0...6, source address = 2.2.2.2>
    permit <source port = 8...65535, source address = 2.2.2.2>
    deny <source address = 1.1.1.1>>,
    source port = 5>
Use the permit rule to reach a complete theory:
<<permit <source port = 0...6, source address = 2.2.2.2>
    permit <source port = 8...65535, source address = 2.2.2.2>
    deny <source address = 1.1.1.1>
    permit <source port 5>>,
    none>

Theory Selection:
1. The main loop of the access list generator works by selecting a theory, removing it from the pool, and adding its derivatives to the pool.
2. The PM selects the "best" available theory from the pool according to these criteria:
   Prefer theories with remainders that have fewer total primitive network cr2teria.
   For theories with equal remainders, prefer theories with shorter so-far access lists.
3. This technique helps the PM find solutions quickly, by preferring theories that are closer to completion.

The received application profiles and the selected QoS are converted into hardware specific low-level CLI commands. The actual implementation of this step is hardware specific. Following is an example implementation for CISCO® routers.

CISCO® "policy maps" are CLI commands that establish queuing techniques for different traffic classes. Policy maps do not provide a way to combine absolute bandwidth criteria (suitable for applications such as voice and video) with relative priority criteria (suitable for applications such as an ORACLE® application and a SAP® application). The PM uses the following method to create CISCO® policy maps:

Use CISCO® "priority" commands to establish fixed low-latency-queue bandwidth reservation for the Voice and Video service planes.

Count the number N of relative priority classes. For example, if a policy maps a PEOPLESOFT® application to Normal, an ORACLE® application to Priority/Low, a SAP® application to Priority/Medium, and a BAAN® application to Priority/High, there are four classes.

Use the CISCO® "bandwidth" command to assign relative bandwidth to each traffic class using this formula:

$$\left\lfloor 100 \times \frac{2^{i-1} - 1}{2^N - 1} \right\rfloor$$

for each class i=1 to N. For example, in the example above, for a BAAN® application, i=4, the formula yields "bandwidth 46."

This method combines absolute and relative priorities in the same policy and effectively translates high-level QoS policy.

One or more routers, for example Customer Premises Equipment (CPE) in the network may then be updated. In order to log in and make configuration changes in the routers, the PM needs to know the router passwords. Customers can choose to save passwords within the PM, or provide passwords when prompted for every change.

The PM represents QoS configlets (lists of configuration commands) as directed acyclic graphs (DAGs). For example, a CISCO® policy-map command is one node in the PM DAG. If two policy-maps use the same underlying access list (for example, when the same policy is applied to two different router interfaces), then the policy-map nodes will point to the same child node in the DAG.

When the PM updates a router, it first checks to see if the router's configuration has changed since the PM last touched the router. If not, the PM retrieves the DAG that was used to produce the last configuration, and compares it to the new DAG.

If a sub-DAG of the new DAG matches a sub-DAG of the old DAG, the PM reuses the old sub-DAG by copying its name into the new DAG.

Any sub-DAGs of the old DAG that are not used in the new DAG are deleted using delete statements of the underlying hardware.

Any sub-DAGs of the new DAG that are not in the old DAG are created.

By following these steps, the PM guarantees maximum reuse of configuration objects that already exist on a target router, and a minimal list of commands. By using a minimal list of commands, the PM speeds router updating.

Service Plane Abstraction

The PM automatically preferably selects the best underlying QoS for each application profile received from the customer. In general, routers provide many low-level QoS technologies. For example, routers manufactured by CISCO® provide techniques, such as low-latency queuing, class-based weighted fair queuing, and weighted random early detection.

The PM hides this detail from end-users by automatically selecting the best underlying technology for a particular need. For example, consider a policy that maps a SAP® application to the Priority plane and video traffic to the Video plane. It has been empirically determined that on CISCO® routers, low-latency queuing with padded bandwidth reservation is the best way to prioritize video traffic, while class-based weighted fair queuing with bandwidth-based tuning is the best way to prioritize application traffic. For the example policy, the PM automatically generates CLI commands corresponding to CISCO® routers to map the video traffic to a low-latency queue and SAP® traffic to a weighted fair queue.

FIG. 1 shows an exemplary network 10. In a preferred and exemplary embodiment, PM 12 comprises a workflow manager 14, a configuration generator 16, a router manager 18, the generic access list generator 20, the web interface 22, and an application layer 24. These elements are implemented in software executing on a computing machine, which may include a general purpose computer, a router, or other network element with a processor capable of executing software or firmware instructions. The software is stored in computer readable media or memory. Furthermore, these elements represent general functions, and these functions may be combined or implemented in a single program or multiple programs, and may run on the same computing machine or be distributed among multiple computing machines. Briefly, application layer 24 reads and writes data to and from a Relational Database Management System (RDBMS) 26. Although an exemplary embodiment of the present invention is discussed herein with reference to the use of RDBMS 26, the invention is not so limited. If desired, any type of data storage mechanism may be used to store the data on any type of persistent data storage device, such as FLASH memory, text or flat files on a disk, and/or the like. Application layer 24 is also capable of verifying whether the application profiles received from the customer are valid. Router manager 18 interfaces with a plurality of routers 28$_1$, 28$_2$, . . . , 28$_N$, for example CPE routers. Workflow manager 14 determines which routers are effected by the changes and calls router manager 18 to update the routers. Workflow manager 14 also calls configuration generator 16 to generate new configurations based on the changes received from the customer.

Figure 2A:
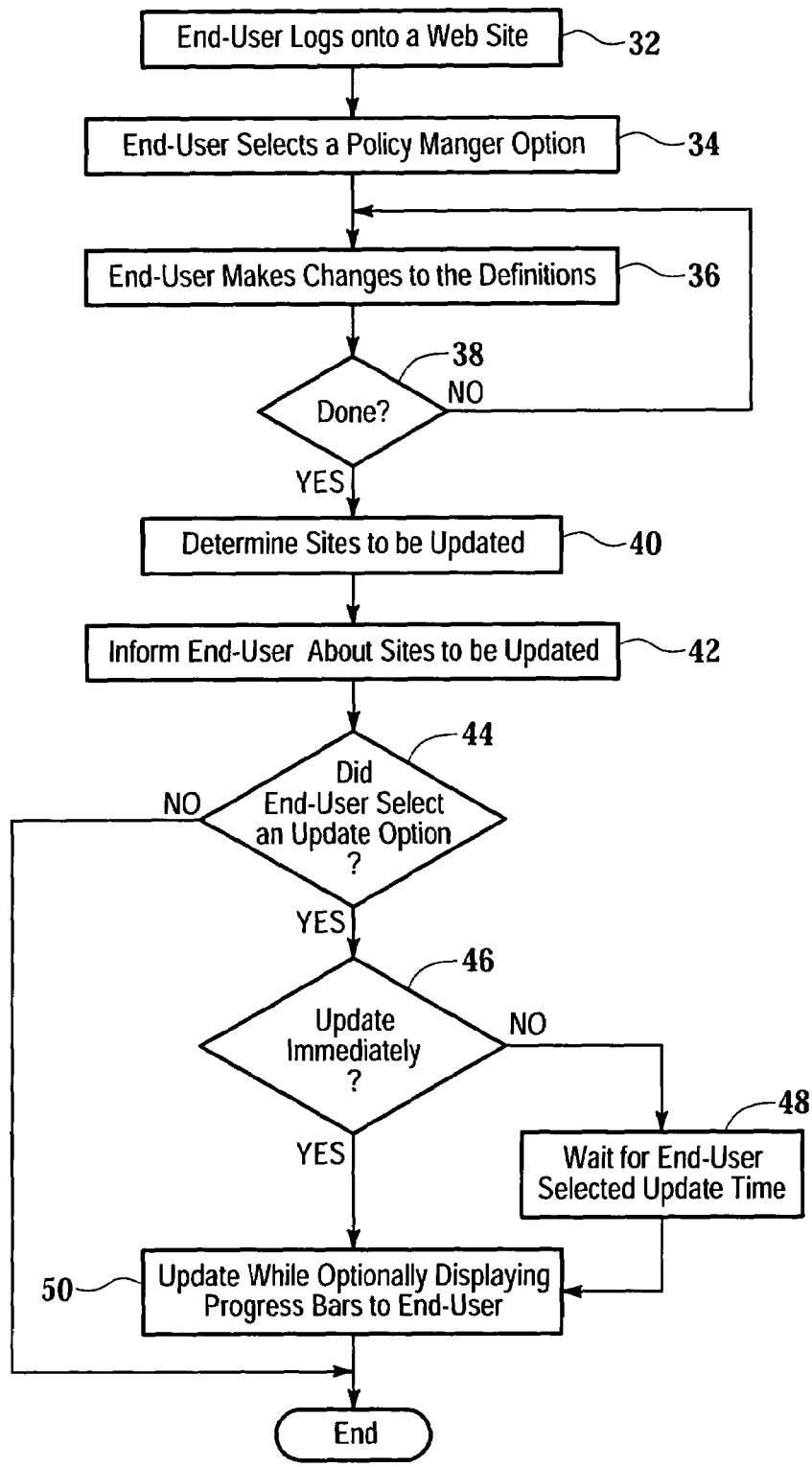
FIG. 2A is a flowchart of a method for providing a customer controlled network.
Figure 2B:
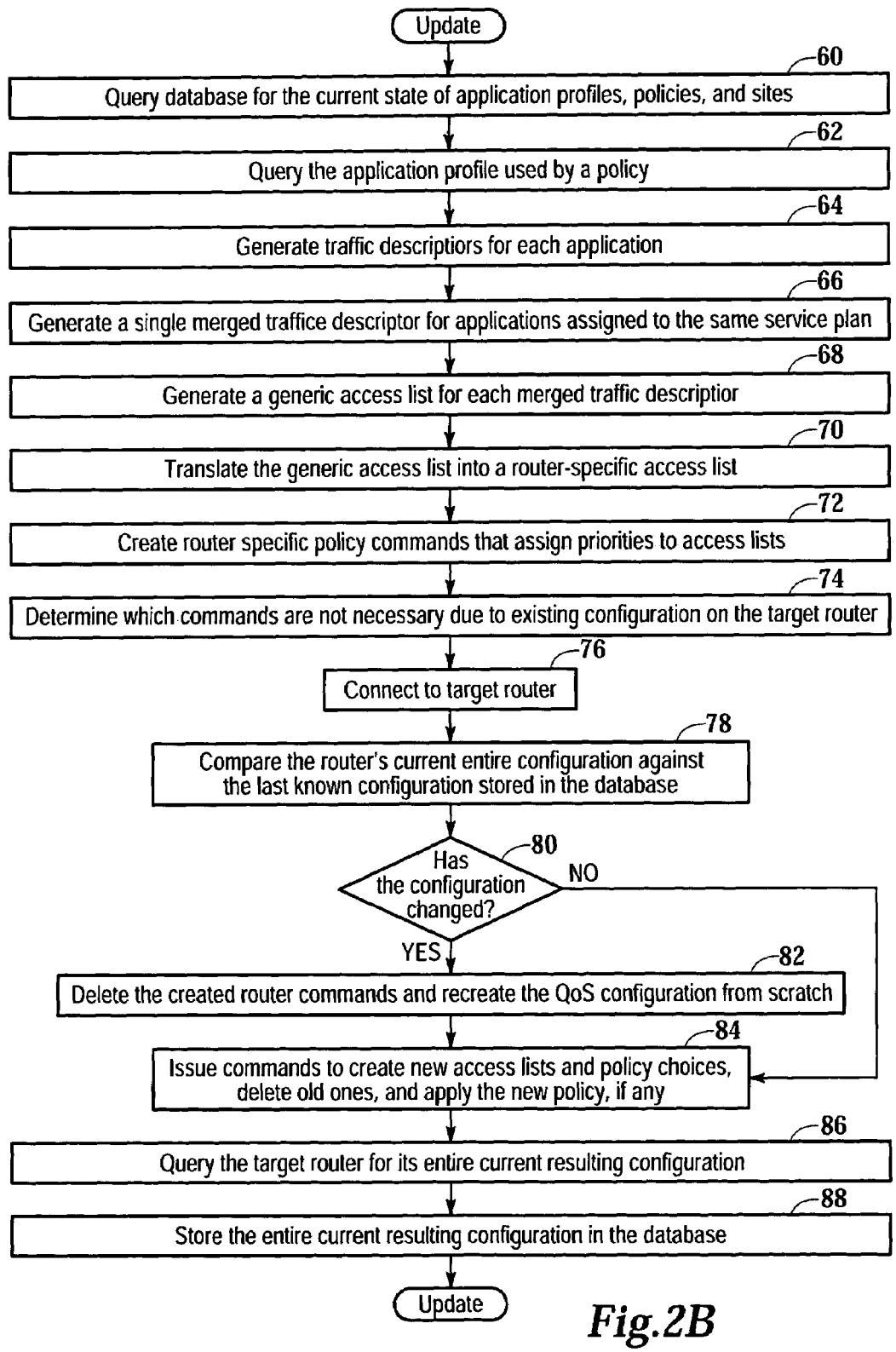
FIG. 2B is a flowchart of a method for automatically updating a network.
Figure 3E:
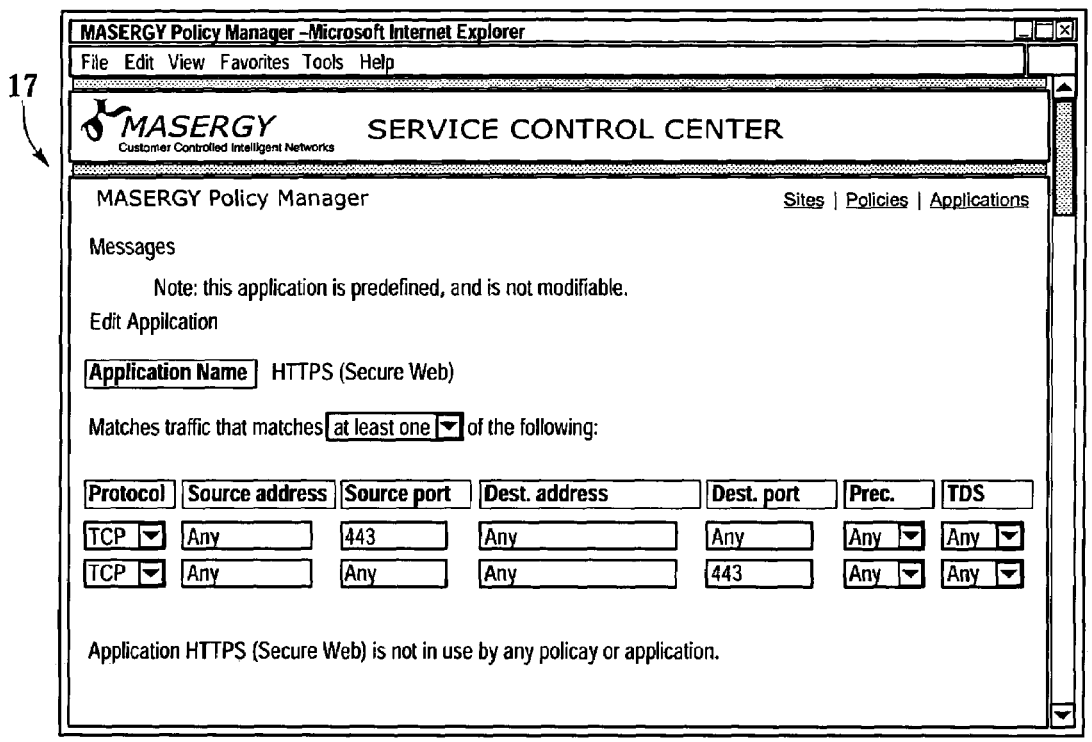

The flowcharts of FIGS. 2A and 2B illustrate an exemplary process flow. At step 32, an end-user, for example, an IT administrator, of a customer logs into a web site (step 32), and selects the PM screen (step 34). At step 36, the customer makes changes to his or her PM definitions using an interface 17, such as shown in FIGS. 3A through 3E. The customer may make one or more of the following changes: select a policy for a router interface that had no policy (one site router may have multiple interfaces); select no policy for an interface that had a policy; select a different policy for an interface; create or delete a policy; select a service plane in a policy for an application that was unprioritized in that policy; change service planes for an application in a policy; select the Normal (unprioritized) plane for an application in a policy. Normal is the default for all applications; create or delete an application; and/or change an application, such as by adding a simple application descriptor, deleting a descriptor, or changing the list of included applications (FIG. 3E).

At step 38, the customer clicks [Done]. At step 40, PM 12 checks dependencies and determines which sites should be updated. For example, if policy A uses application profile B, and site S uses policy A, then S needs to be updated if B changes. At step 42, PM 12 presents a screen to the customer, detailing which sites need to be updated at step 42. The customer can choose to update immediately, not update, or update at a specific time.

As indicated by steps 44, 46, 48 and 50, if the customer chooses to update at a specific time, PM 12 waits for that time to arrive before beginning the update process. When it is time to update, PM 12 queries the database for the current state of the customers application profiles, policies, and sites at step 60 (FIG. 2B). For each site that needs to be updated, and for each policy applied to an interface on that site, PM 12 performs one or more of the steps of FIG. 2B as discussed below.

Figure 3F:
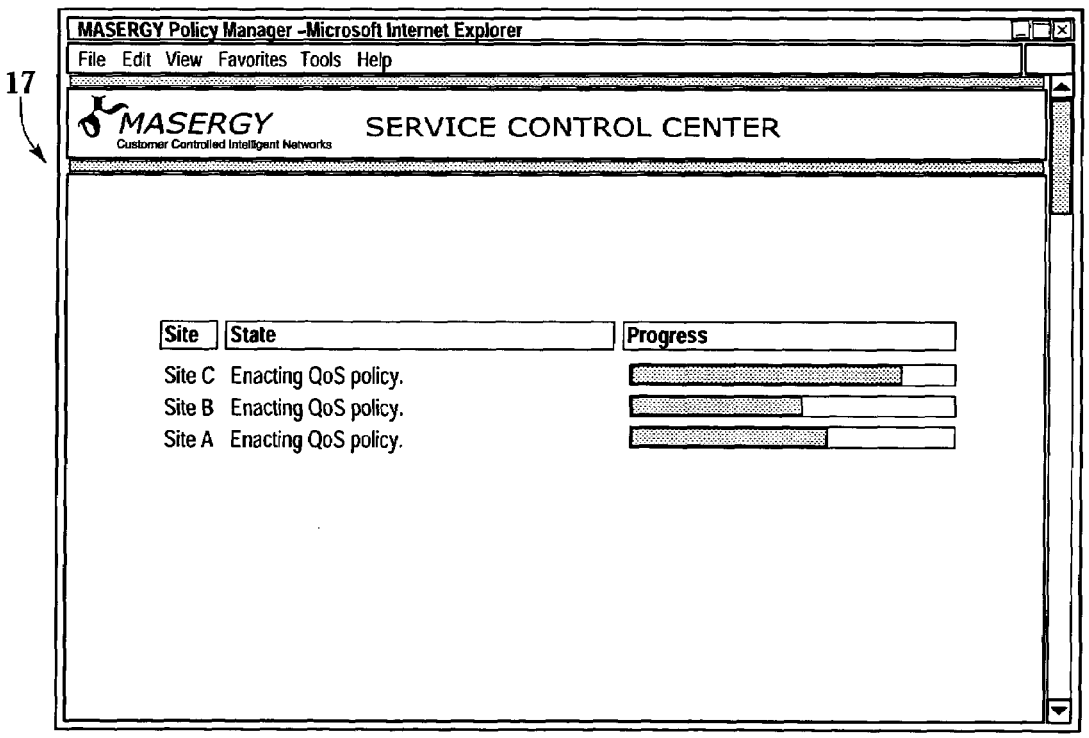

At step 62, PM 12 queries the application profiles used by that policy. At step 64, PM 12 generates traffic descriptors for each application. At step 66, PM 12 merges traffic descriptors for applications assigned to the same service plane. For example, if a Web application and an ORACLE® application are both assigned to Reserved, the PM generates a single traffic descriptor that matches traffic that is associated with the Web application or the ORACLE® application. At step 68, PM 12 generates a generic access list for each merged traffic descriptor. At step 70, PM 12 translates the generic access list into a router-specific access list. At step 72, PM 12 creates router specific policy commands that assign priorities to access lists. At step 74, PM 12 determines which commands are not necessary due to existing configuration on the target router. At step 76, PM 12 connects to the target router via telnet or Secure Shell (SSH) (user configurable). At step 78, the router's current entire configuration is compared against the last known configuration stored in the database. If the configuration changed, PM 12 deletes PM 12 created router commands and recreates the QoS configuration from scratch at steps 80 and 82. At step 84, PM 12 issues commands to create new access lists and policy choices, delete old ones, and apply the new policy if any. At step 86, PM 12 queries the target router for its entire current resulting configuration. At step 88, PM 12 stores the entire current resulting configuration in the database. At step 50 (FIG. 2A), PM 12 reports interactive progress bars to the user during the update as shown in FIG. 3F.

Policy Inheritance:

When a customer creates a policy, the customer may optionally base that policy on another policy. A policy inherits the prioritization selection of its base policy, and may override with additional selections. For example, consider a policy Corporate that prioritizes a SAP® application and an ORACLE® application on the Priority plane.

A customer applies Corporate to all sites. Then, the customer adds a new site that has VoIP traffic. The customer creates a new policy, CorporateVoice, based on Corporate. In CorporateVoice, the customer defines one prioritization: voice traffic to the Voice service plane. When the customer adds a BAAN® policy to the Corporate policy, all sites are updated, including the site with CorporateVoice. That site is the only site with prioritized voice traffic.

Exemplary screen shots of the web interface component of PM 12 are illustrated in FIGS. 3A through 3F.

Although an embodiment of the present invention has been described above with different modules performing different operations, the invention is not so limited. One or more of the above described modules may be combined without departing from the scope of the present invention. Embodiments of the present invention may be implemented in software, hardware, or a combination of both software and hardware.

If desired, the different steps discussed herein may be performed in any order and/or concurrently with each other. Furthermore, if desired, one or more of the above described steps may be optional or may be combined without departing from the scope of the present invention.

What is claimed is:

1. A method comprising:
   receiving a profile specifying a quality of service (QoS) treatment for packets for at least one application in one or more packet networks;
   automatically generating for said application, based at least in part on said profile at least one Boolean expression of primitive IP network predicates identifying the IP packets generated from said application the at least one of the IP network primitives being selected from the group of transmission protocol, source address, destination address, source ports, destination ports, precedence value, and type of service; and
   automatically generating configuration information for one or more network elements of said one or more packet networks for treatment of the packets for the at least one application according at least in part to the at least one Boolean expression.

2. The method of claim 1, further comprising updating a configuration of said one or more network elements based at least in part on said configuration information.

3. The method of claim 1, further comprising selecting, prior to automatically generating configuration information, said one or more network elements for which said configuration information is to be generated.

4. The method of claim 1, wherein the configuration information includes at least one generic access list automatically generated based at least in part on said at least one Boolean exprssion.

5. The method of claim 4, further comprising generating a corresponding network element specific access list for each of said at least one generic access lists.

6. The method of claim 5, further comprising updating a configuration of said one or more network elements based at least in part on said network element specific access list.

7. The method of claim 1, further comprising generating a generic access list for each of said at least one applications.

8. The method of claim 1, further comprising generating a generic access list for each of said at least one applications, each of said generic access lists comprising:
   at least one clause comprising one or more network criteria; and
   at least one match rule specifying whether said one or more packets matching said one or more network criteria are to be permitted or denied.

9. The method of claim 8, wherein said one or more network criteria is selected from the group consisting of a protocol, a source address, a destination address, a source port, a destination port, an Internet Protocol precedence value and an Internet Protocol type of service value.

10. The method of claim 1, further comprising generating at least one access list from said at least one Boolean expression, said at least one access list being independent of a type of said one or more network elements.

11. The method of claim 1, wherein said receiving step comprises receiving a service plane selection for said at least one application, said service plane specifying at least said quality of service treatment.

12. The method of claim 11, wherein said service plane selection is selected from the group consisting of a normal service plane, a low priority data service plane, a medium priority data service plane, a high priority data service plane, a reserved bandwidth service plane, a video service plane, and a voice service plane.

13. The method of claim 11, further comprising assigning a priority to said at least one application based at least in pan on said service plane selection.

14. The method of claim 1, wherein said profile comprises at least one combination rule.

15. The method of claim 1, wherein said profile comprises at least one combination rule specifying that network traffic that meets all of a plurality of criteria be accepted.

16. The method of claim 1, wherein said profile comprises at least one combination rule specifying that network traffic tat meets at least one of a plurality of criteria be accepted.

17. The method of claim 1, wherein said profile comprises at least one combination rule specifying that network traffic that meets none of a plurality of criteria be accepted.

18. The method of claim 1, wherein said automatically generating said at least one Boolean expression comprises:
   translating said profile for each of said at least one user applications into a corresponding Boolean expression; and
   combining said Boolean expressions according to at least on combination rule.

19. The method of claim 1, wherein said automatically generating said at least one Boolean expression comprises translating at least one simple application descriptor into a conjunction of a plurality of components of said at least one simple application descriptor.

20. The method of claim 19, wherein one or more of said plurality of components are selected from the group consisting of a protocol, a source address, a destination address, a source port, a destination port, an Internet Protocol precedence value and an Internet Protocol type of service value.

21. A programmable device storing instructions that, when read by the programmable device, cause the programmable device to perform a method comprising:
   generating non-Boolean configuration information for a network element from at least in part one or more Boolean expressions on primitive IP network predicates describing IP packets from an application to be transmitted over a packet network, the primitive network predicates including one or more elements selected from a group consisting of transmission protocol, source address, destination address, source ports, destination ports, precedence value, and type of service identified in the packets; and
   causing configuration of the network element using the non-Boolean, configuration information.

22. The programmable device of claim 21, wherein the method farther comprises converting an application profile to the one or more Boolean expressions, the application profile indicating a quality of service treatment packets originated by the application.

23. The programmable device of claim 22, wherein the application profile is received from a customer running the application, the customer transmitting traffic from the application to an edge device on a network, of which the network element is a part.

24. The programmable device of claim 22, wherein the method further comprises generating for each of a plurality of application profiles one or more Boolean expressions of primitive network predicates and combining the one or more Boolean expressions of each application into a merged Boolean expression from which the configuration information is generated.

25. The programmable device of claim 24, wherein the plurality of applications are associated with a single service plan on a network, to which the network element belongs.

26. The programmable device of claim 21, wherein the configuration information includes an access list.

27. The programmable device of claim 26, wherein the method further comprises translating the generic access list into a device-specific access list.

28. The programmable device of claim 27, further comprising generating policy commands for assigning priorities to the device-specific access list.

29. A method for generating configuration information, comprising:

generating from an application profile one or more Boolean expressions on primitive IP network predicates, the application profile containing a high-level description of treatment of IP packets originating from the application for transmission over a network, the primitive IP network predicates including one or more elements selected from a group consisting of transmission protocol, source address, destination address, source ports, destination ports, precedence value, and type of service identified in the packets; and generating from at least in part the one or more Boolean expressions non-Boolean, configuration information for a network element.

30. The method of claim 29 further comprising generating for each of a plurality of application profiles one or more Boolean expressions on primitive IP network predicates and combining the one or more expressions of each application into merged expressions, from which the configuration information is generated.

31. The method of claim 30, wherein the application profile is received front a customer running the application, the customer transmitting traffic from the application to an edge device on a network, of which the network element is a part.

32. The method of claim 29, wherein the configuration information includes an access list.

33. The method of claim 32, further comprising translating the generic access list into a device-specific access list.

34. The programmable device of claim 33, further comprising generating policy commands for assigning priorities to the device-specific access list.

35. A network comprising a plurality of configurable network elements and at least one programmable device, the programmable device being programmed to perform a method comprising: generating non-Boolean configuration information for a network element from at least in part Boolean expressions on primitive IP network predicates identifying the IP packet traffic from the application, the primitive IP network predicates including one or more elements selected from a group consisting of transmission protocol, source address, destination address, source ports, destination ports, precedence value, and type of service identified in the packets; and causing configuration of at least one of the plurality of network elements using the non-Boolean, configuration information.

36. The network of claim 35, wherein the method further comprises converting an application profile to the one or more Boolean expressions, the application profile indicating a quality of service treatment for packets originated by an application.

\* \* \* \* \*

UNITED STATES PATENT AND TRADEMARK OFFICE
CERTIFICATE OF CORRECTION

| | | |
|---|---|---|
| PATENT NO. | : 7,191,229 B2 | |
| APPLICATION NO. | : 10/624090 | |
| DATED | : March 13, 2007 | |
| INVENTOR(S) | : Shawn E. Edmondson | |

It is certified that error appears in the above-identified patent and that said Letters Patent is hereby corrected as shown below:

In the Claims:

At column 15, claim number 4, line number 46, please delete the word "exprssion" and replace with the word -- expression --.

At column 16, claim number 13, line number 16, please delete the word "pan" and replace with the word -- part --.

At column 16, claim number 16, line number 25, please delete the word "tat" and replace with the word -- that --.

At column 16, claim number 22, line number 62, please delete the word "farther" and replace with the word -- further --.

At column 18, claim number 31, line number 6, please delete the word "front" and replace with the word -- from --.

Signed and Sealed this
Nineteenth Day of July, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,191,229 B2 | Page 1 of 1 |
| APPLICATION NO. | : 10/624090 | |
| DATED | : March 13, 2007 | |
| INVENTOR(S) | : Shawn E. Edmondson | |

It is certified that error appears in the above-identified patent and that said Letters Patent is hereby corrected as shown below:

In the Claims:

At column 17, claim number 25, line number 13, please delete the word "plan" and replace with the word -- plane --.

Signed and Sealed this
Eleventh Day of October, 2011

David J. Kappos
*Director of the United States Patent and Trademark Office*